April 24, 1934.  R. F. ANDERSON  1,956,264
FLUID TIGHT JOINT
Filed June 9, 1931
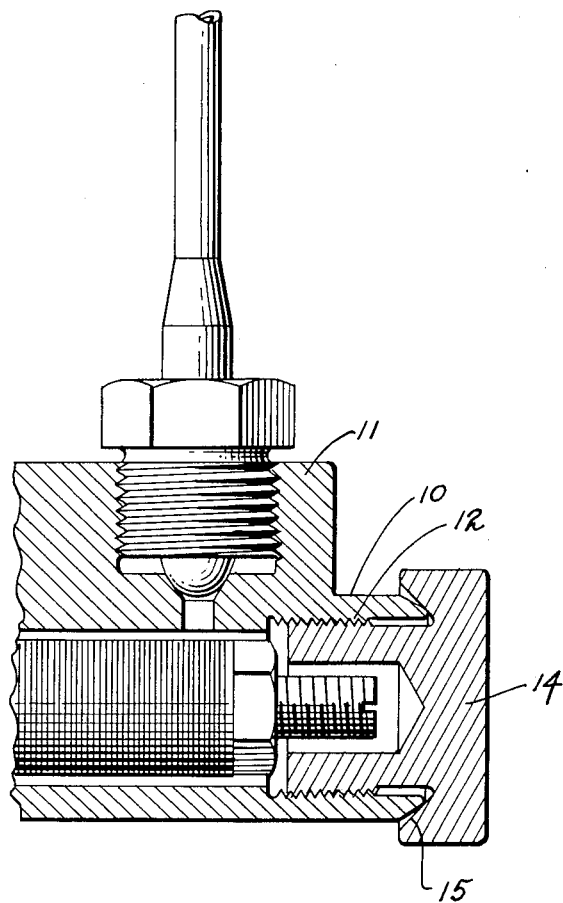
INVENTOR.
Roy F. Anderson
BY
Townsend, Loftus & Abbett
ATTORNEYS.

Patented Apr. 24, 1934

1,956,264

UNITED STATES PATENT OFFICE 1,956,264

FLUID-TIGHT JOINT

Roy F. Anderson, San Francisco, Calif., assignor to Atlas Imperial Diesel Engine Company, Oakland, Calif., a corporation of Delaware Application June 9, 1931, Serial No. 543,155

1 Claim. (Cl. 137—76)

This invention relates to joints between parts of fluid conducting or containing apparatus.

It is the principal object of the present invention to provide a simple and effective joint between adjacent and connected parts of apparatus conducting or containing fluid under comparatively high pressures.

In carrying the invention into practice I provide one portion of the apparatus with a nipple adapted to expand under internal pressure. The terminating end of this nipple is tapered so as to fit within a circumscribing flange on the adjacent and connected portion of the apparatus. This flange is comparatively heavy so as not to expand under internal pressure and thereby to enable the tapered end of the nipple to be forced into line contact therewith to form a fluid-tight joint between the parts.

One form which the invention may assume is exemplified in the following description and illustrated by way of example in the accompanying drawing, in which:

The figure is a view in central vertical section through an apparatus adapted to contain and convey fluid under comparatively high pressure, which apparatus is fitted with a fluid-tight joint embodying my invention.

Referring more particularly to the accompanying drawing, I disclose a simple medium for forming a fluid-tight joint between two connecting parts. In this connection I show a hollow cylindrical nipple 10 which may be part of a conduit or which may project from a casting such as indicated at 11 having a chamber or passageway adapted to receive liquid under pressure or through which liquid under pressure is adapted to travel. The wall of the nipple 10 is comparatively thin so that it will expand to some extent under the influence of the fluid pressure.

At a spaced distance from its outer terminal, the interior bore of the nipple 10 is threaded as at 12, the root of the threads being at least in the plane of the bore of the nipple intermediate the threads and its outer extremity. While this is desirable, it is not particularly necessary. The outer extremity of the nipple is tapered to a relatively thin edge.

A nut or cap 14 is provided having a shank portion which is exteriorly threaded to engage the threads interiorly of the nipple. The threads on the nipple and nut are of standard V shaped type, the female thread being actually V shaped while the male thread is slightly rounded or blunt on its outer edge so that a small spiral passageway exists throughout the length of the threaded connection permitting fluid under very high pressure to escape to the outer end of the nipple. While this type of thread is here illustrated it is not absolutely essential as it is well known that any type of thread is subject to more or less leakage under extremely high pressures. The nut or cap 14 is formed with a comparatively thick circumscribing flange having an interior angular face 15 which is adapted to overlie the tapered end of the nipple. The angle of this angular face 15 is greater relative to the axis of the nipple than the angle of the tapered end of the nipple so that there will be a line contact between the angular face of the cap or coupling and the tapered end of the nipple 10.

In operation of the device, assuming that there is fluid pressure interiorly of the nipple 10 and that the cap or coupling 14 has been threaded into position where there will be line contact between the end of the nipple and the angular face of the nut or cap 14, the interior fluid pressure within the nipple causes expansion thereof and forces it into firm contact with the overlying angular face of the cap. As this face is formed on a heavy flange which will not expand under pressure a fluid-tight joint between the parts will result. Also, the greater the pressure exerted within the nipple 10, the tighter the joint between the co-acting surfaces of the nipple and cap or nut 14 due to the expansibility of the nipple and the non-expansibility of the surrounding flange. It will clearly appear that if the nut 14 were bored centrally throughout its length and provided with threads and a flange 15 at both ends it could be used as a coupling for securing two nipples or conduits together. Thus the invention is applicable to more than one type of connection and could by obvious means be applied to elbow or T shaped connections if desired.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A fluid-tight joint comprising an internally threaded nipple forming one part, an externally threaded cap forming the other part, a circumscribing flange formed on the cap so that when the latter is connected with the nipple by means of the said screw threads it overlies the end portion of the nipple, the end of the nipple being tapered, the surface of the flange contiguous to the tapered end being tapered at a greater angle relative to the axis of the nipple and adapted to be placed in line contact with the end of the nipple, said nipple being adapted to expand under internal pressure, said circumscribing flange being comparatively non-expansible under the same pressure whereby expansion of the nipple will cause its tapered end to be forced into tight contact with the contiguous surface of the flange.

ROY F. ANDERSON.